US009463519B2

(12) United States Patent
Zeller (10) Patent No.: US 9,463,519 B2
(45) Date of Patent: Oct. 11, 2016

(54) MACHINE TOOL AND METHOD FOR THE MACHINING OF WORKPIECES HAVING AT LEAST TWO SEPARATE MACHINING UNITS

(71) Applicant: Liebherr-Verzahntechnik GmbH, Kempten (DE)

(72) Inventor: Thomas Zeller, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 34 days.

(21) Appl. No.: 14/448,546

(22) Filed: Jul. 31, 2014

(65) Prior Publication Data

US 2015/0043984 A1 Feb. 12, 2015

(30) Foreign Application Priority Data

Aug. 8, 2013 (DE) .......................... 10 2013 013 276

(51) Int. Cl.
*B23F 23/04* (2006.01)
*B23F 17/00* (2006.01)
(Continued)

(52) U.S. Cl.
CPC ............. *B23F 17/006* (2013.01); *B23Q 1/012* (2013.01); *B23Q 1/4819* (2013.01); *B23Q 1/522* (2013.01); *B23Q 3/15506* (2013.01); *B23Q 41/04* (2013.01); *B23B 3/30* (2013.01); *B23F 5/205* (2013.01); *B23F 21/12* (2013.01); *B23F 23/04* (2013.01); *B23Q 3/157* (2013.01); *B23Q 3/1552* (2013.01); *B23Q 3/15513* (2013.01); *Y10T 408/365* (2015.01); *Y10T 408/935* (2015.01); *Y10T 409/10* (2015.01); *Y10T 409/101431* (2015.01); *Y10T 409/105883* (2015.01); *Y10T 409/307168* (2015.01); *Y10T 409/308288* (2015.01); *Y10T 409/308344* (2015.01);

(Continued)

(58) Field of Classification Search
CPC .......... B23Q 3/15506; B23Q 3/15513; B23Q 3/1552; B23Q 3/157; B23F 23/04; B23F 5/205; B23F 21/12; B23B 3/30
USPC ......... 409/38, 212, 234, 213, 192, 217, 201; 408/53, 32, 34, 43, 42, 236, 237; 82/122, 125; 483/30
See application file for complete search history.

(56) References Cited

U.S. PATENT DOCUMENTS 2,876,650 A * 3/1959 Sangster ................. B23B 39/04
192/143
3,575,086 A 4/1971 Davis
(Continued)

FOREIGN PATENT DOCUMENTS

DE 971083 C 12/1958
DE 19645324 A1 5/1998
(Continued)

OTHER PUBLICATIONS

English Translation of DE 971083 C.*

*Primary Examiner* — Daniel Howell
*Assistant Examiner* — Yasir Diab
(74) *Attorney, Agent, or Firm* — Alleman Hall McCoy Russell & Tuttle LLP (57) ABSTRACT

The present disclosure relates to an apparatus as well as to a method for the manufacture or processing of large tooth systems for internal or external teeth or large cogs in small production runs, wherein at least two machining methods are used with the aim of a complete machining of precision-relevant surfaces at these workpieces and while realizing production times which are as short as possible.

9 Claims, 7 Drawing Sheets

(51) Int. Cl.
  *B23Q 1/01* (2006.01)
  *B23Q 1/48* (2006.01)
  *B23Q 1/52* (2006.01)
  *B23Q 41/04* (2006.01)
  B23Q 3/157 (2006.01)
  B23F 5/20 (2006.01)
  B23Q 3/155 (2006.01)
  B23F 21/12 (2006.01)
  B23B 3/30 (2006.01)
(52) U.S. Cl.
  CPC . *Y10T409/308568* (2015.01); *Y10T 483/1733* (2015.01)

(56) References Cited

U.S. PATENT DOCUMENTS

| | | | | |
|---|---|---|---|---|
| 4,589,174 A * | 5/1986 | Allen | ............ | B23Q 1/48 29/33 R |
| 4,658,485 A * | 4/1987 | Yang | ............ | B23Q 1/012 29/26 A |
| 5,081,889 A * | 1/1992 | Takano | ............ | B23B 5/02 82/122 |
| 5,779,406 A * | 7/1998 | Astor | ............ | B23C 3/34 29/888.02 |
| 5,839,323 A * | 11/1998 | Line | ............ | B23Q 1/012 408/37 |
| 5,919,012 A * | 7/1999 | Nakagawa | ............ | B23C 1/00 409/132 |
| 6,067,695 A * | 5/2000 | Momoitio | ............ | B23Q 1/012 29/26 A |
| 6,865,788 B2 * | 3/2005 | Pasquetto | ............ | B23Q 1/5437 269/57 |
| 2002/0107122 A1 * | 8/2002 | Hoppe | ............ | B23Q 3/1552 483/46 |
| 2006/0270540 A1 * | 11/2006 | Takayama | ............ | B23Q 1/012 483/41 |
| 2007/0170140 A1 * | 7/2007 | Gaunekar | ............ | B23Q 1/012 212/312 |
| 2009/0308214 A1 * | 12/2009 | Watanabe | ............ | B23B 3/165 29/27 R |

FOREIGN PATENT DOCUMENTS

| | | |
|---|---|---|
| DE | 202007012450 U1 | 11/2007 |
| DE | 102009008012 A1 | 10/2009 |
| JP | S5828417 A | 2/1983 |
| WO | 2013037947 A2 | 3/2013 |

* cited by examiner

MACHINE TOOL AND METHOD FOR THE MACHINING OF WORKPIECES HAVING AT LEAST TWO SEPARATE MACHINING UNITS

CROSS REFERENCE TO RELATED APPLICATION

This application claims priority to German Patent Application No. 10 2013 013 276.2, entitled "Machine Tool and Method for the Machining of Workpieces Having at Least Two Separate Machining Units," filed Aug. 8, 2013, which is hereby incorporated by reference in its entirety for all purposes.

TECHNICAL FIELD

The present disclosure relates to an apparatus as well as to a method for the manufacture or processing of large tooth systems for internal or external teeth or large cogs in small production runs, wherein at least two machining methods are used with the aim of a complete machining of precision-relevant surfaces at these workpieces and while realizing production times which are as short as possible.

BACKGROUND AND SUMMARY

Large gear cutting machines are known from the prior art which can currently machine machining diameters of 16,000 mm and more. In this respect they are hobbing and profile milling machines as well as gear planing machines. These machines are also available as gear grinding machines and gear shaping machines for somewhat smaller workpiece diameters.

Since the workpieces for the gear cutting process come from a preprocessing such as a forging operation or are assembled from individual segments with very large workpieces, they first have to be subjected to a turning, milling and/or drill machining before a gear cutting machining in order thus to provide the functional surfaces for the use of these gears. The throughput times for these machining operations can take one day up to several days in part, including the set-up times, with workpieces of this order of magnitude.

The usual separation of premachining operations and gear cutting operations onto a plurality of individual machines customary in mass production represents a substantial investment cost in a plurality of machines on the manufacture of large teeth and then also has the consequence of a large space requirement for the setting up of the individual machines. Complete production halls then fast become planned for such machines. Machines of this dimension also usually require a huge additional foundation so that these machines cannot be repositioned in the production area without problem. Substantial investment sums result from this which only pay their way when corresponding volumes are also provided.

With very large teeth or with inappropriate volumes, a combination machine can be considered which can carry out both the gear cutting operations and also the preparatory cutting operations such as turning, milling or drilling or further additional operations such as plane and/or external circular grinding.

There are already different concepts for the machining of large teeth which are frequently oriented on the portal construction of large upright machining centers such as disclosed, e.g., by DE 20 2007 012 450.

In the shown upright machining center of the so-called double-column type, the two columns move parallel to the workpiece (Y direction) and thus move the cross-member fastened between these two columns over the workpiece. A support carriage is mounted on the cross-member which can be moved along the transverse carriage at a right angle (X direction) to the direction of travel of the columns. Practically all positions over the workpiece can be traveled to by these movements in the X/Y directions with a sufficient travel path.

The delivery of the cutting tool to the workpiece takes place via a lowering movement of the cross-bar (W direction) and a vertical delivery (Z direction, parallel to the W direction) of the RAM configuration with the milling head fastened thereto to bring the tool into engagement with the workpiece. The cross-bar in this configuration has to absorb bending and torsion forces which result from the machining forces and the weight of the machining head.

A gear-cutting machine in a vertical construction is described in a similar embodiment in DE 10 2009 008 012 A.1 The two columns having the cross-bar are not moved, but are stationary, with respect to the first-named publication. Instead the machine table moves relative to the workpiece in the direction of the machining head. The moved masses of the machine table are smaller in this embodiment with respect to the above-named embodiment.

With large teeth, especially when large modules are milled, very large machining forces arise which nevertheless result in a bending of the cross-bar and of the vertical guide of the ram configuration. These forces in turn have the result of a quality reduction of the gears thus milled independently of whether the gear-cutting process is a hobbing or profile milling process. The assembly arrangement of the gear-cutting milling head at a cross-member with a RAM configuration is considerably inferior to the classical design of a gear-cutting machine in accordance with the prior art with respect to the precision and the force absorption from the gear-cutting milling process. The forces are, however, lower, have a different direction of force effect and can be absorbed more easily by this construction without any great losses in quality for the normal turning, milling or drilling operation carried out at these workpieces. If the second machining is a grinding machining, even lower forces have to be taken up by the second machining head.

Within this arrangement, too, the length of the cross-member has a considerable influence on its bending and torsion properties or a shorter cross-member of the same construction has much better properties with respect to its bending and torsion.

The present disclosure now combines the positive properties of a gear-cutting machine with the positive properties of an upright machining center for turning/milling operations in a two-column embodiment and in so doing simultaneously increases the stability of the total machine. This is achieved by a machine tool having a correspondingly smaller space requirement being required instead of a plurality of individual machines.

From the aspect of the basic design, a gear-cutting machine for large machines in accordance with the prior art is combined with a vertical turning/milling device having two columns. With respect to the prior art, however, this machine differs at least in that the transverse portal does not extend over the total machine width and in this respect has to be very long and thus flexible. In the machine in accordance with the present disclosure, the second column is located in the middle of the machine table, where the self-supporting length can be almost halved and the crossbeam becomes a lot stiffer or can be configured with a smaller cross-section with the same bending stiffness.

To load the workpieces onto the machine table, the cross-member/portal carrier in the machine in accordance with the present disclosure is configured as outwardly pivotable. In addition, the column in the middle of the machine in the table can be lowered so that the workpieces can be conveyed more easily onto the table.

The outward pivotability of the cross-member/portal carrier furthermore offers still a further advantage. Further machining units and/or tool holders can thus be supported within the machine housing at defined preparation spaces. These spaces can be moved to under NC control by the machining head via the portal carrier. A change of the machining heads and/or a tool change can take place there via an automatic interface in dependence on the design of the selected interface or in accordance with the selected machining operation.

In a further embodiment of the portal carrier, it can be lowered together with the middle column and the outer column so that the linear axles of the RAM configuration do not project so far outwardly during machining, which produces a much more stable axle, which in turn produces a better machining result or makes much higher cutting performances possible.

A movability of the transverse portal over the workpiece is not necessary since rotationally symmetrical workpieces may be machined using this machine. All required work positions can be traveled to by a combination of the rotational movement of the table with a linear travelability of the second machining unit radially to the table.

Further details of the present disclosure will be described in the drawing with reference to schematically shown embodiments.

DETAILED DESCRIPTION

Figure 1:
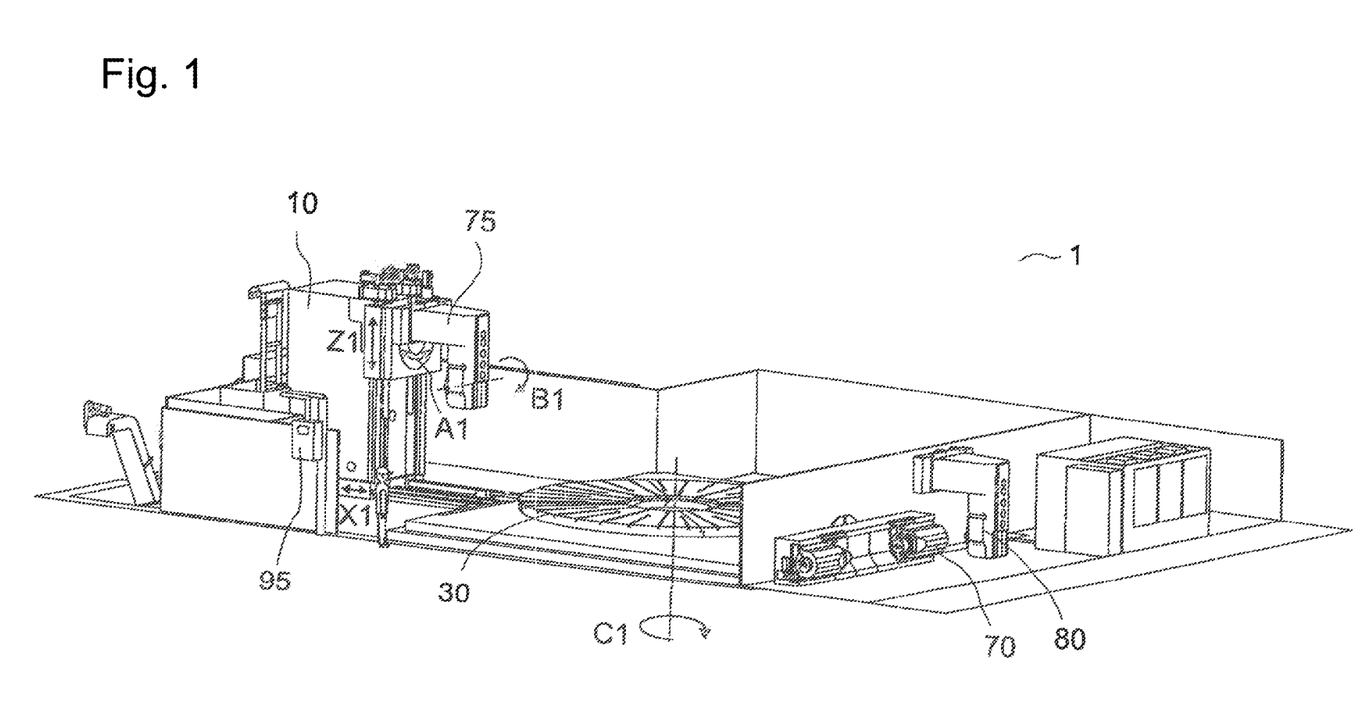
FIG. 1 shows a gear-cutting machine, in particular for large teeth, in accordance with the prior art.

FIG. 1 shows a perspective view of a gear-cutting machine 1 for machining inner teeth in accordance with the prior art for machining large teeth. The gear-cutting machine in this respect has the degrees of freedom required for the machining and can in particular carry out the drawn movements A1, B1, C1, X1 and Z1. In detail, X1 describes the radial movement of the column carriage, Z1 the axial movement of the tool, B1 the rotary movement of the tool, C1 the rotary movement of the workpiece and A1 the pivot movement of the tool. Workpieces which are fastened to the machine table 30 can be machined at their inner diameters with the machining head shown for inner teeth 75. For this purpose, the machining head for inner teeth 75 is moved by the machine column 10 to the machining site with the X1 axle and dips during the machining by a linear movement of the Z1 axle into the workpiece and in so doing generates the teeth, with the tool rotating about its B1 axis for this purpose. This is controlled by an NC control with an operating unit 95. The further machining heads 70, 80 can be replaced as required with the machining head for inner teeth 75 if, e.g., outer teeth are to be machined. In this case, the machining head for outer teeth 70 is mounted instead of the machining head for inner teeth 75.

Figure 2:
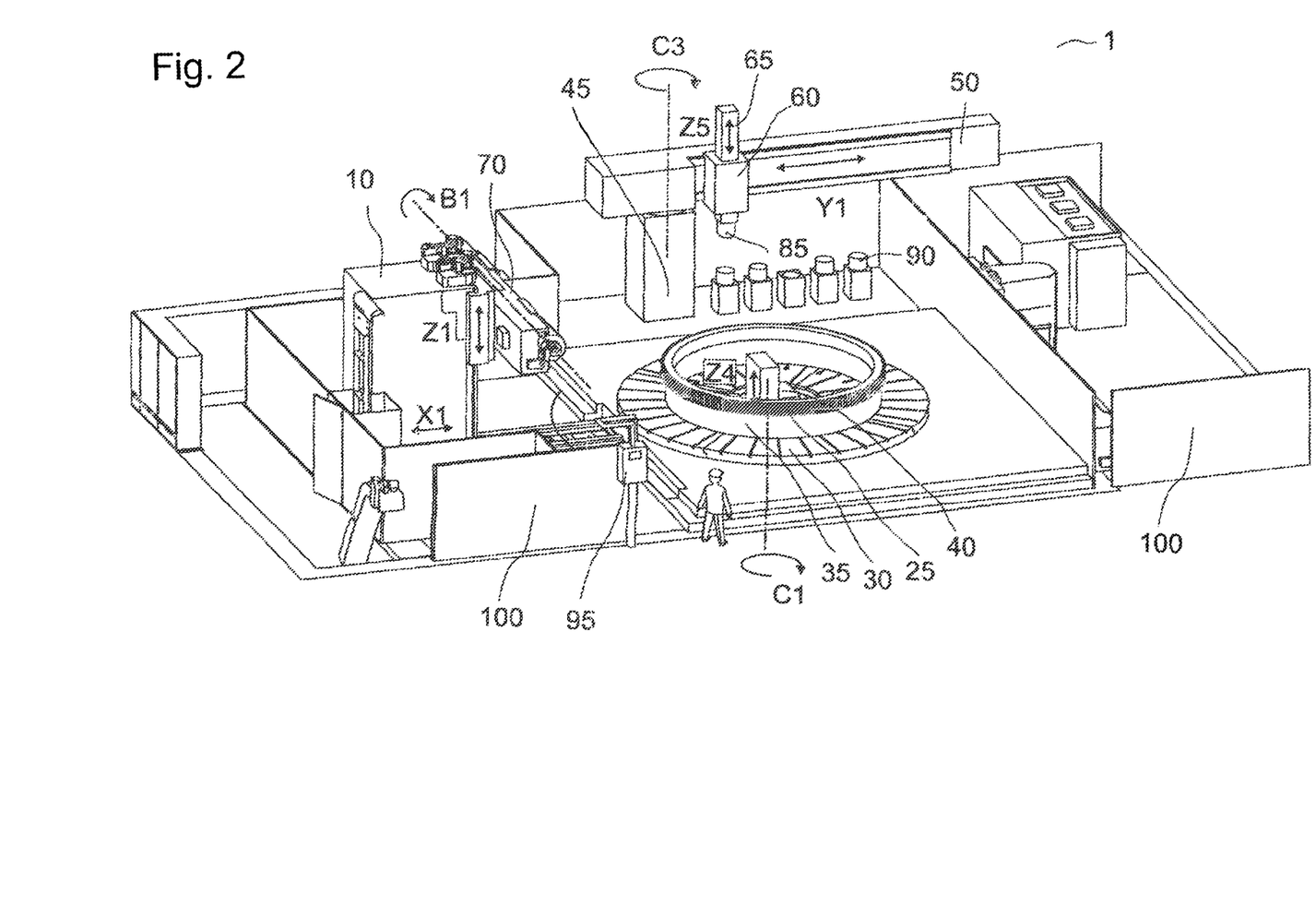
FIG. 2 shows a machine tool having a machining head for outer teeth in accordance with an embodiment of the present disclosure.

In FIG. 2, a perspective representation of an embodiment of the machine in accordance with the present disclosure is shown. In turn, the machining head for outer teeth 70 is mounted at the machine column 10. The portal carrier 50 with the second machining head 60 mounted thereat is located in an outwardly pivoted position. This position is reached in that the portal carrier is pivoted about the C3 axis on the outer support column 45. The support column 40 is here shown in the middle of the machine table 30 in its lowered position.

The second machining head 60 in this embodiment has a vertical guide 65 via which a machining unit 85 can be supplied by the Z5 axle in the direction toward the workpiece 25 and is there brought into engagement with the workpiece. The workpiece 25 is in this respect clamped on the apparatus 35 and on the machine table 30.

In the outwardly pivoted position of the portal carrier, a change of the machining units 85 or of the tool for a machining unit can take place. The machining head 60 is for this purpose moved via the Y1 axle along the portal carrier 50 for so long until an empty preparation space 90 is located beneath the machining head 60. Subsequently, the machining unit 85 is lowered via the linear unit in the Z5 axial direction and the no longer required machining unit 85 or the tool is placed down in this space in that the automatic interface is opened after reaching the placing down position. The linear unit 65 is again moved upwardly and the machining head 60 travels over the position with the new tool or the new machining unit. The linear unit 65 there travels downwardly until its automated interface travels onto the next tool or the next machining head. The interface closes and the linear unit 65 again travels back together with the tool or machining unit 85 into the working position by a Y1 axial movement and an inward pivoting of the portal carrier about the C3 axis.

For reasons of safety, the working space is closed during the machining in that the two sliding doors 100 are moved together.

Figure 3:
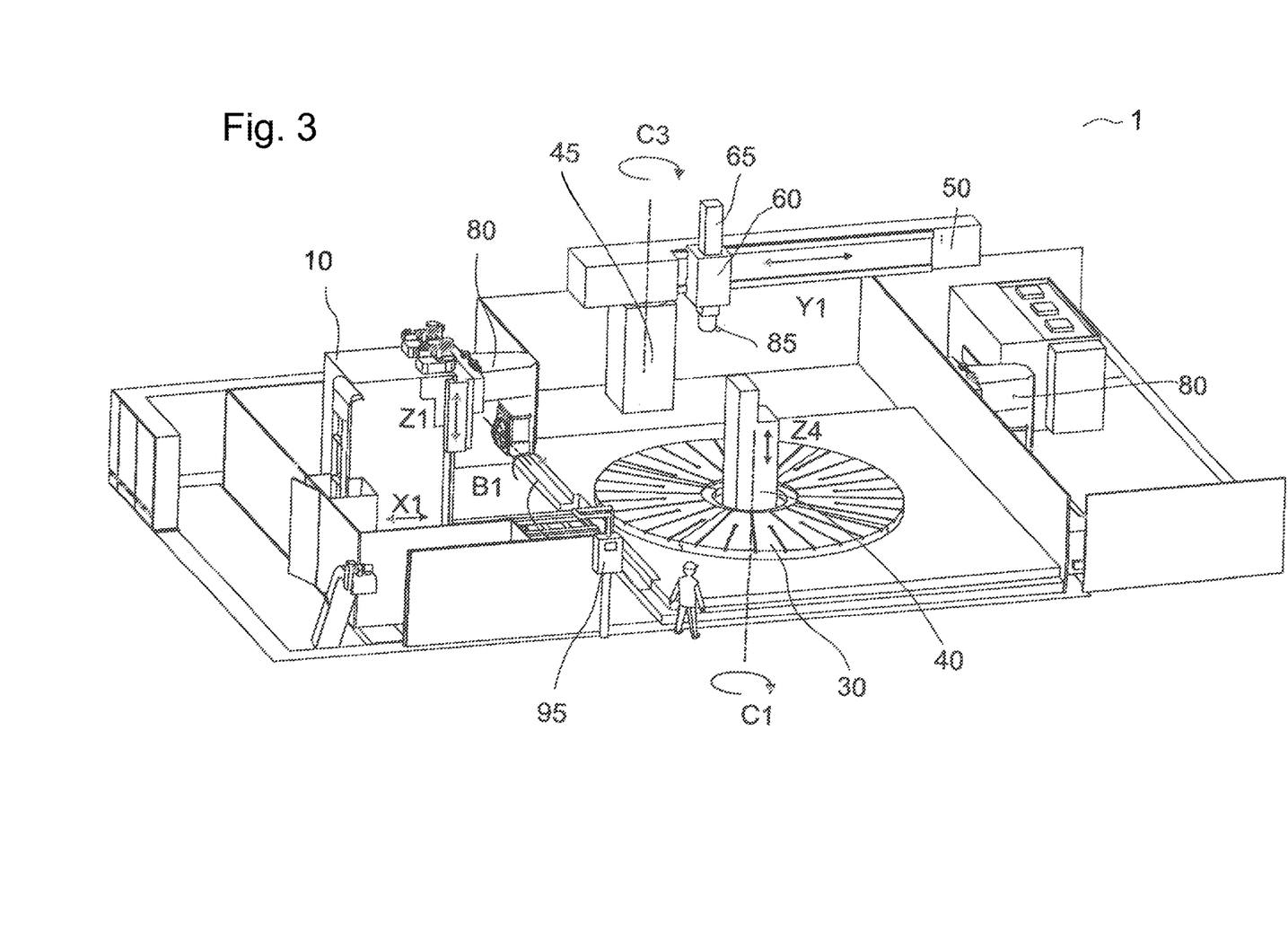
FIG. 3 shows a machine tool having a machining head for inner teeth in accordance with an embodiment of the present disclosure.
Figure 4:
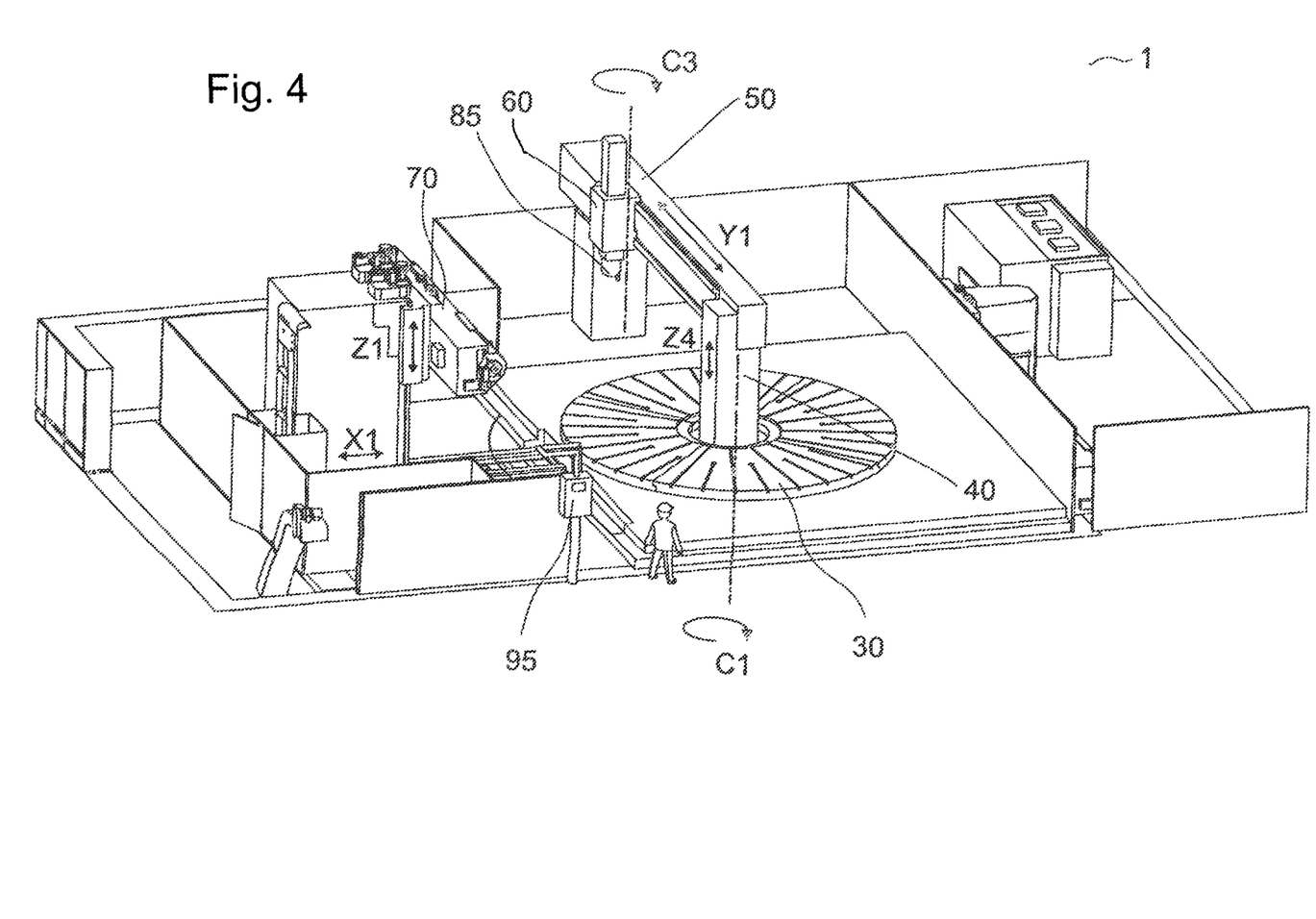
FIG. 4 shows a machine tool having an inwardly pivoted portal in accordance with an embodiment of the present disclosure.
Figure 5:
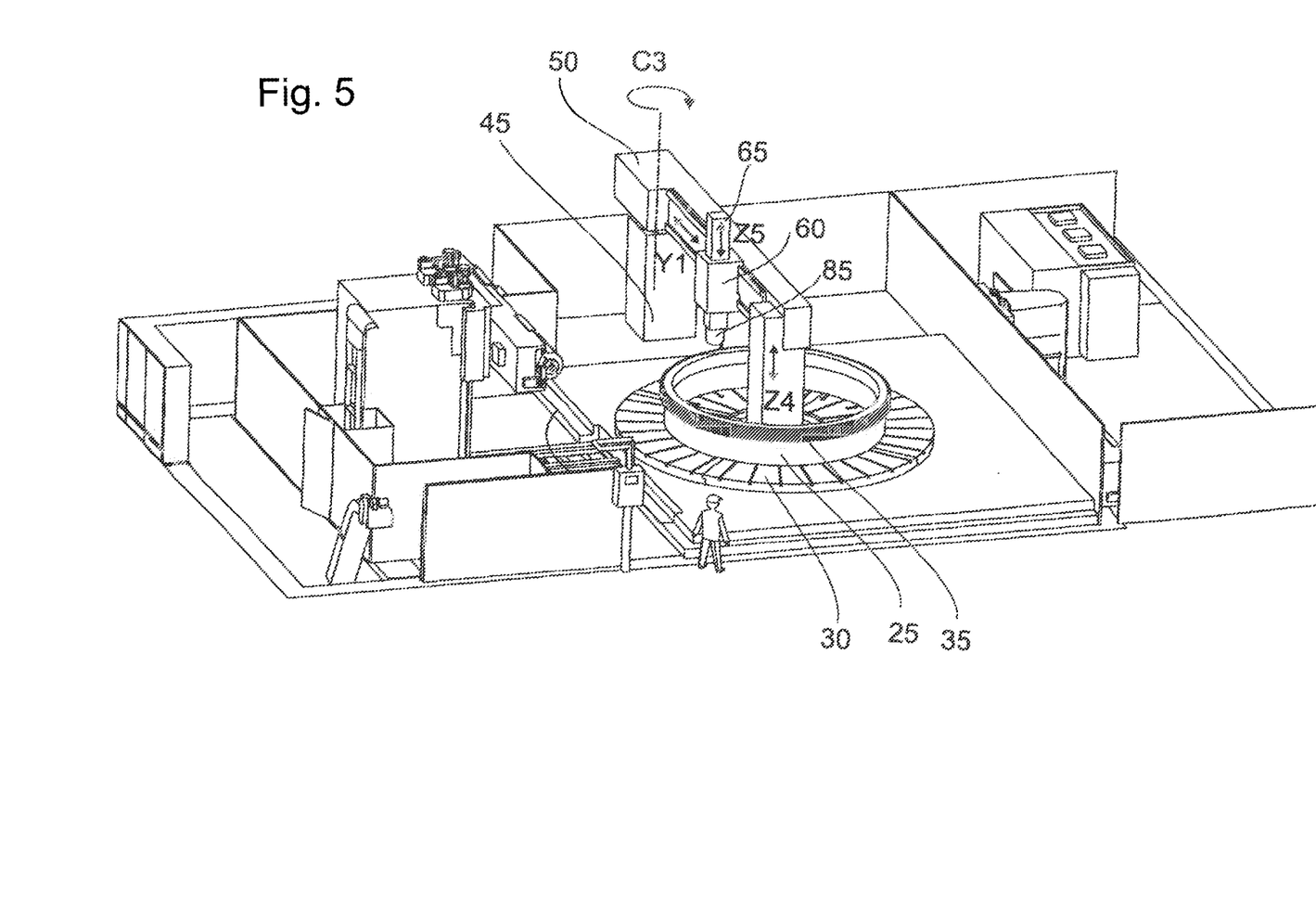
FIG. 5 shows a machine tool having an inwardly pivoted portal and the second machining head in its work position in accordance with an embodiment of the present disclosure.

FIG. 3 now shows a perspective representation of the machine in accordance with the present disclosure in which the middle support column is raised. The portal carrier can now be moved into its working position by pivoting the portal carrier about the C3 axis. For this purpose, the front end of the carrier is coupled via coupler elements suitable for this purpose with the support column in the table middle 40 as is shown in FIG. 4. For the machining, the second machining head 60 can now be moved along the Y1 axis in the direction toward the table middle into its working position. This situation is shown in FIG. 5. The machining unit 85 is in this respect located in engagement with the workpiece 25 and machines its surface.

Figure 6:
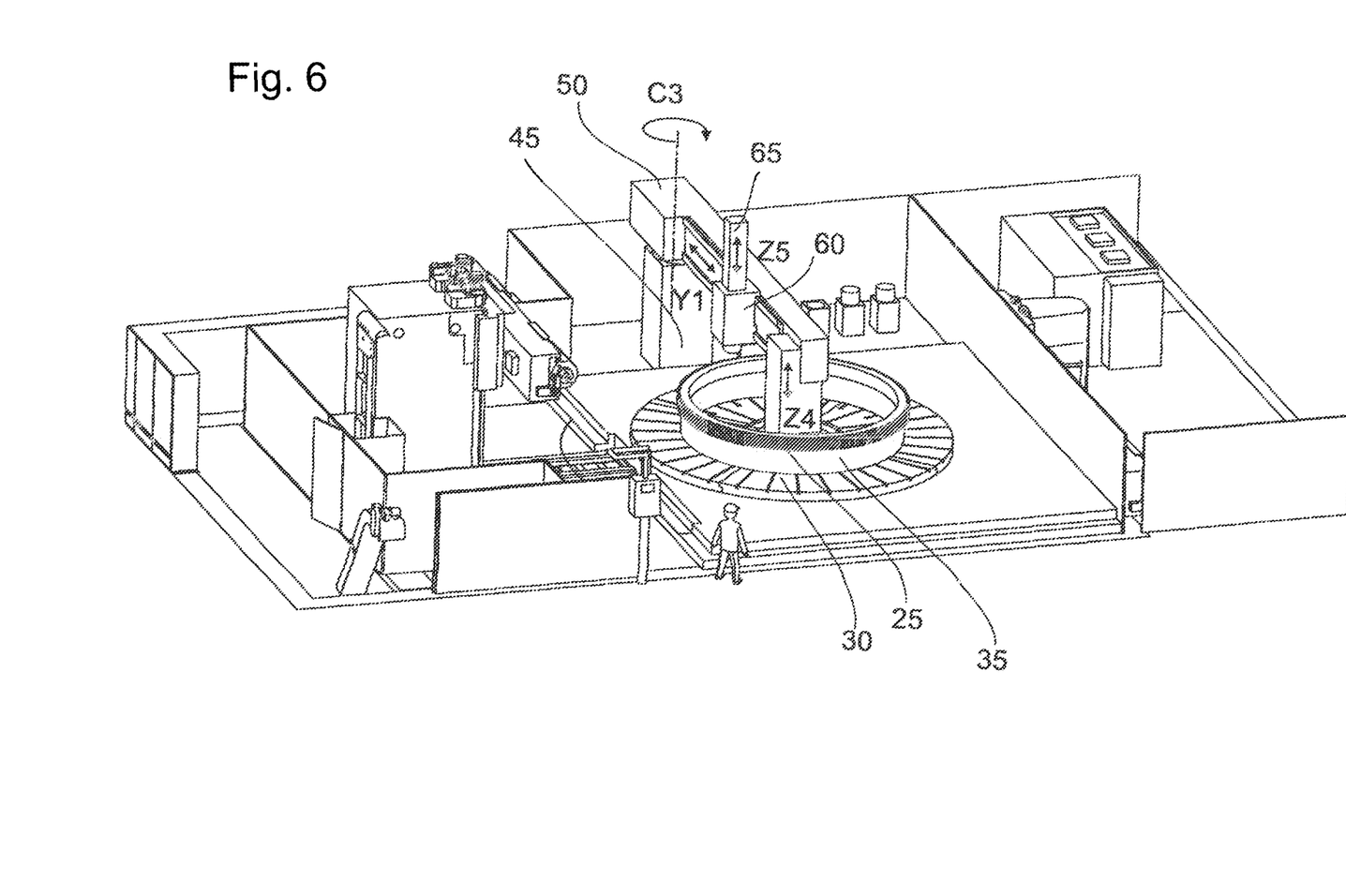
FIG. 6 shows a machine tool having an inwardly pivoted portal and the second machining head in its work position in accordance with an embodiment of the present disclosure.

FIG. 6 shows the machine in accordance with the present disclosure in an embodiment in which the two columns 40, 45 were lowered together with the portal carrier to bring the tool into engagement. The outward projection of the linear unit is hereby considerably reduced. Higher cutting performances can hereby be processed or the quality of the machined surface is improved due to a lower sag of the linear unit.

Figure 7:
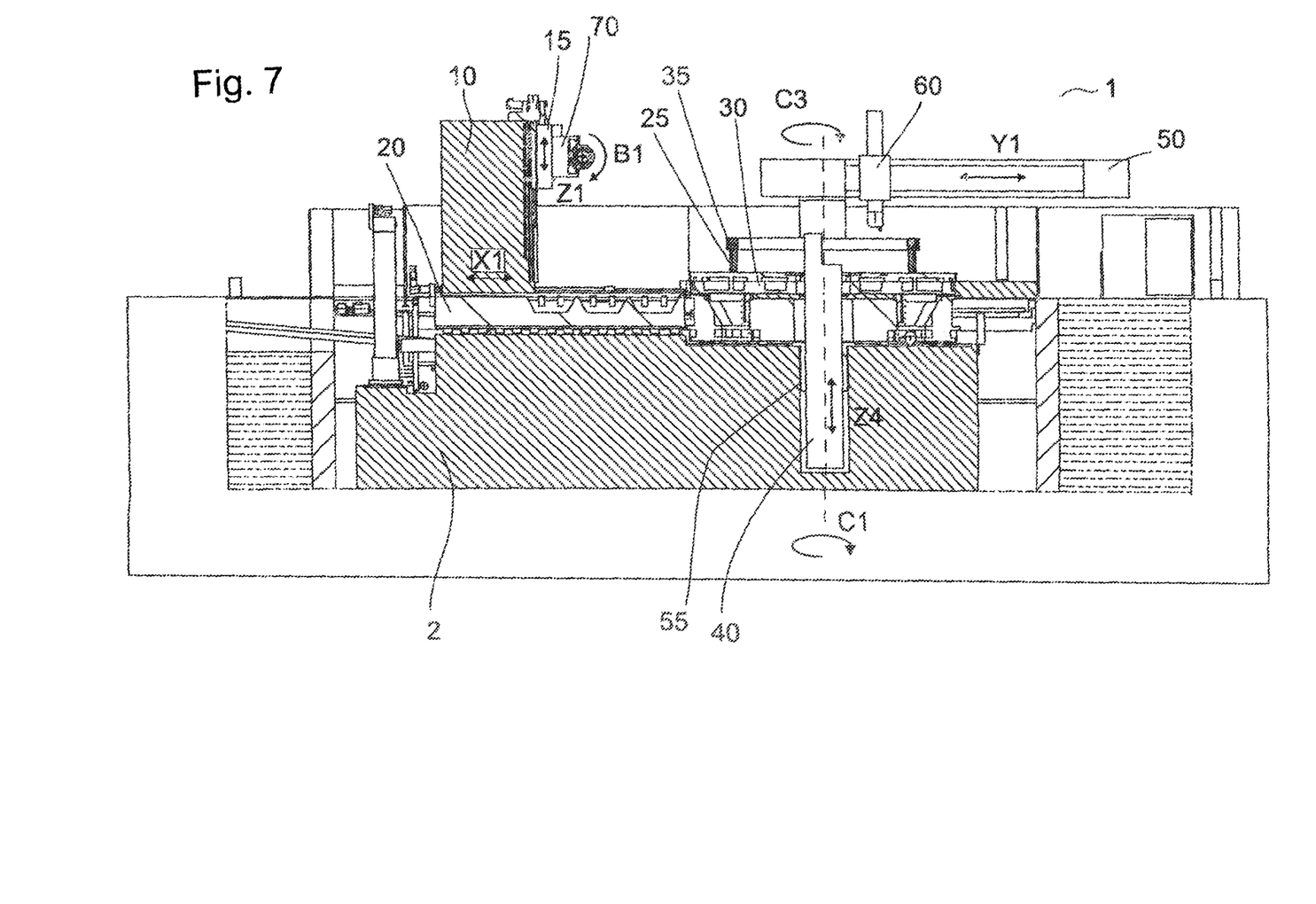
FIG. 7 shows a section through a machine tool in accordance with an embodiment of the present disclosure. The figures are drawn approximately to scale and thus illustrate example relative dimensions and positioning with respect to each other, although other relative dimensions and positioning may be used, if desired.

A section through an embodiment of the machine in accordance with the present disclosure is shown in FIG. 7. The support column 40 is shown in the middle of the machine table 30 in its lowered position. The column is supported in its support position 55 which allows a movement of the support column in the direction of the Z4 axis. A workpiece 25 with the apparatus 35 is mounted on the machine table 30. For machining this workpiece 25, the machining head 70 is delivered with the column 10 along the X1 axis on the column bed 20 in the direction toward the workpiece 25. The carriage 15 serves to adjust the height of the machining head 70 in the Z1 direction or to move the machining head 70 in the axial direction of the workpiece 25, while the tool generates or machines the teeth.

The invention claimed is:

1. A machine tool for machining of workpieces comprising at least two machining devices, wherein at least one machining device is provided for gear cutting manufacture and machining and a second machining device is provided for a further machining of workpieces, wherein at least one of the machining devices is fastened to a portal carrier which is supported by a lowerable column in a middle of a workpiece table.

2. The machine tool in accordance with claim 1, wherein the one machining device is designed for manufacture and/or machining of teeth.

3. The machine tool in accordance with claim 1, wherein the at least one machining device is designed as replaceable for manufacture and/or machining of teeth so that different machining heads are mountable for different tooth machining of outer teeth and/or inner teeth.

4. The machine tool in accordance with claim 3, wherein the portal carrier is outwardly pivotable with the second machining device.

5. The machine tool in accordance with claim 1, wherein at least two supports for the portal carrier are travelable in height.

6. The machine tool in accordance with claim 1, wherein machining heads of the at least two machining devices are changeable or replaceable via an automated interface.

7. The machine tool in accordance with claim 1, wherein machining heads of the at least two machining devices are equipped with an automated interface for tool changing.

8. The machine tool in accordance with claim 1, wherein the portal carrier is a transverse portal carrier that does not extend over a total device width.

9. The machine tool in accordance with claim 1, wherein the second machining device is an upright machining center machine for turning/milling operations.

* * * * *